(12) United States Patent
Lin

(10) Patent No.: US 8,842,204 B2
(45) Date of Patent: Sep. 23, 2014

(54) IMAGE CAPTURING DEVICE, DUST REMOVAL SYSTEM AND VIBRATING DUST REMOVAL METHOD THEREOF

(75) Inventor: Chao-Yi Lin, Zhubei (TW)

(73) Assignee: Altek Corporation, Hsinchu (TW)

( * ) Notice: Subject to any disclaimer, the term of this patent is extended or adjusted under 35 U.S.C. 154(b) by 315 days.

(21) Appl. No.: 13/446,351

(22) Filed: Apr. 13, 2012

(65) Prior Publication Data

US 2013/0176467 A1    Jul. 11, 2013

(30) Foreign Application Priority Data

Jan. 5, 2012   (TW) .............................. 101100385 A

(51) Int. Cl.
*H04N 5/335*    (2011.01)
(52) U.S. Cl.
USPC ........................................................ 348/294
(58) Field of Classification Search
CPC ... H04N 5/2171; G02B 27/0006; G06F 3/016
See application file for complete search history.

(56) References Cited

U.S. PATENT DOCUMENTS

| | | | |
|---|---|---|---|
| 8,314,844 B2 * | 11/2012 | Tashiro et al. | 348/222.1 |
| 2007/0195185 A1 * | 8/2007 | Onuki | 348/333.02 |
| 2010/0074554 A1 * | 3/2010 | Gyotoku | 382/275 |
| 2010/0315712 A1 * | 12/2010 | Kawai | 359/508 |
| 2011/0194020 A1 * | 8/2011 | Nishimoto et al. | 348/362 |
| 2011/0262126 A1 * | 10/2011 | Kawai et al. | 396/529 |

* cited by examiner

*Primary Examiner* — Gary C Vieaux
(74) *Attorney, Agent, or Firm* — Wang Law Firm, Inc.; Li K. Wang; Stephen Hsu

(57) ABSTRACT

An image capturing device, a dust removal system and a vibrating dust removal method thereof. The image capturing device comprises an image sensor, a vibrating dust removal unit, an optical component adapter, a detector, a touch screen and a controller. The image sensor receives an optical signal and converts the optical signal into an image signal. The vibrating dust removal unit produces a vibration to remove dust from the image sensor. The detector detects whether a detachable optical component is connected to the optical component adapter and generates a detecting signal. The touch screen displays the image signal and allows a user to designate a dust-removal position. The controller receives the detecting signal to enter into a dust-removal mode or controls the frequency or amplitude of the vibration produced by the vibrating dust removal unit according to the dust-removal position.

18 Claims, 5 Drawing Sheets

IMAGE CAPTURING DEVICE, DUST REMOVAL SYSTEM AND VIBRATING DUST REMOVAL METHOD THEREOF

CROSS-REFERENCE TO RELATED APPLICATION

This application claims the benefit of Taiwan Patent Application No. 101100385, filed on Jan. 5, 2012, in the Taiwan Intellectual Property Office, the disclosure of which is incorporated herein in its entirety by reference.

BACKGROUND OF THE INVENTION

1. Field of the Invention

The present invention relates to an image capturing device, a dust removal system and a vibrating dust removal method thereof, and more particularly to the image capturing device, the dust removal system and the vibrating dust removal method capable of generating vibration to remove dust according to a user specified dust-removal position.

2. Description of Related Art

As digital technologies advance, lens replaceable type digital camera such as the selling price of a digital single lens reflex (DSLR) camera, the price is no longer as high as several tens of thousand dollars and becomes affordable. Therefore, the lens-replaceable type digital camera has become an indispensable 3C product. The lens-replaceable type digital camera allows users to change the camera lens to an appropriate focus according to the scene or figures. However, an open slot is required for the camera to change the lens, and the dust or foreign substance in the environment may enter into the camera, and the dust will be adhered or attached onto the image sensor. Many different sized dust dots appear on the images to affect the overall texture and quality of the picture.

At present, most conventional dust removal methods use a vibrating dust removal unit to perform the vibrating dust removal of the image sensor, and most of the vibrating dust removal units perform the vibrating dust removal by the maximum amplitude or frequency of the vibration, and this method usually requires more electric power. Alternatively, the settings of different types of vibration parameters in the camera can be selected by users. If the parameters selected by the users cannot remove dust effectively (such as the adhesive force of the adhering the dust onto the image sensor is larger), then it is necessary to stop the dust removal operation. Another larger or maximum parameter is converted to remove the dust, and thus the dust removal time is increased significantly.

However, some people are used to remove the dust manually, but the dust removal process generally needs to take a picture first, and then the dust removal operation is performed according to the displayed position of the picture. After the dust removal process is finished, another picture is required to confirm whether the dust is at the moved position, and this method takes much time and requires a more complicated process for turning on/off the camera, or installing/removing the camera lens.

In summation of the description, the inventor of the present invention designs an image capturing device, a dust removal system and a vibrating dust removal method to overcome the shortcomings of the prior art, and enhance the industrial application.

SUMMARY OF THE INVENTION

In view of the aforementioned shortcomings of the prior art, it is a primary objective of the invention to provide an image capturing device, a dust removal system and a vibrating dust removal method thereof to overcome the problems of the prior art that wastes power consumption and requires a long dust removal time.

To achieve the foregoing objective, the present invention provides an image capturing device comprising an image sensor, a vibrating dust removal unit, an optical component adapter, a detector, a touch screen and a controller. The image sensor receives an optical signal to convert an optical signal into an image signal. The vibrating dust removal unit produces a vibration to perform a dust removal of the image sensor. The detector is provided for detecting whether a detachable optical component is connected to the optical component adapter, and generating a detecting signal. The touch screen is provided for displaying an image signal and provided for a user to touch a dust-removal position. The controller is provided for entering into a dust-removal mode upon the receipt of the detecting signal, or controlling a frequency or amplitude of the vibration produced by the vibrating dust removal unit according to the dust-removal position.

Wherein, when the user continues touching the dust-removal position, the controller controls the vibrating dust removal unit to increase the amplitude or the frequency of the vibration gradually.

Wherein, when the controller controls the vibrating dust removal unit to perform the dust removal for a time exceeding a predetermined time, the controller controls the vibrating dust removal unit to stop producing the vibration.

Wherein, when the user stop touching the dust-removal position or the amplitude or the frequency of the vibration reaches the maximum value, the controller controls the vibrating dust removal unit to stop producing the vibration.

To achieve the aforementioned objective, the present invention provides a dust removal system, applicable in an image capturing device installed with a detachable lens, comprising a vibrating dust removal unit, a dust-removal interface, a selecting module and a controller. The vibrating dust removal unit is provided for producing a vibration to perform a dust removal of an image sensor of the lens-replaceable type image capturing device. The dust-removal interface is displayed on a display unit, and provided for a user to browse a dust-removal position. The selecting module, provided for the user to generate a selecting signal according to the dust-removal position of the dust-removal interface. The controller is provided for calculating an amplitude or a frequency of the vibration according to the selecting signal, so as to control a vibrating dust removal unit to perform a vibrating dust removal.

Wherein, the dust removal system further comprises a detector for detecting an installation status of the detachable lens when the lens replaceable type image capturing device is turned on Wherein, the controller determines whether the image capturing device operates at a normal operating interface or the dust-removal interface according to the installation status.

Wherein, the dust-removal position indicates at least one dust spot displayed on the image sensor of the image capturing device.

Wherein, when the user continues selecting the dust-removal position, the controller controls the vibrating dust removal unit to increase the amplitude and the frequency of the vibration gradually.

Wherein, when the user finishes selecting the dust-removal position or the amplitude and the frequency of the vibration reaches the maximum value, the controller controls the vibrating dust removal unit to stop producing the vibration.

Wherein, when the vibrating dust removal unit produces vibration over a predetermined time, the controller controls the vibrating dust removal unit to stop producing the vibration.

Wherein, the selecting module is a touch module installed at the display unit or a plurality of control buttons installed at the image capturing device.

To achieve the aforementioned objective, the present invention provides a vibrating dust removal method, applicable in an image capturing device installed with a detachable lens, and the vibrating dust removal method comprising the steps of: displaying a dust-removal interface on a display unit for a user to browse a dust-removal position; providing a selecting module for the user to generate a selecting signal according to the dust-removal position; and using a controller to calculate an amplitude or a frequency of the vibration according to the selecting signal and control a vibrating dust removal unit to perform a vibrating dust removal of an image sensor.

Wherein, the method further comprises the steps of using a detector to detect an installation status of the detachable lens, when the image capturing device is turned on; and using the controller to determine whether the lens-replaceable type image capturing device performs a normal operating interface or the dust-removal interface according to the installation status.

Wherein, the dust-removal position indicates at least one dust spot displayed on the image sensor of the image capturing device.

Wherein, the method further comprises the step of increasing the amplitude or the frequency of the vibration produced by the vibrating dust removal unit when the user continuously selects a dust-removal position.

Wherein, the method further comprises the steps of controlling the vibrating dust removal unit by the controller to stop producing the vibration when the user finishes selecting the dust-removal position or the amplitude or the frequency of the vibration reaches the maximum value; and allowing the user to enter into a next dust-removal interface or a normal operating interface.

Wherein, the method further comprises the steps of calculating whether the vibration of the vibrating dust removal unit for the dust removal exceeds a predetermined time; and controlling the vibrating dust removal unit to stop producing the vibration, if the vibration is performed exceeding the predetermined time.

Wherein, the selecting module is a touch module installed at the display unit or a plurality of control buttons installed at the image capturing device.

In summation, the image capturing device, the dust removal system and the vibrating dust removal method in accordance with the present invention have one or more of the following advantages:

(1) The image capturing device, dust removal system and vibrating dust removal method can display a dust-removal position for users to intuitively select their desired dust-removal position to improve the convenience of removing dust.

(2) The image capturing device, dust removal system and vibrating dust removal method can display a dust-removal position for users to select the dust-removal position, so as to determine the corresponding amplitude or frequency of the vibration to improve the efficiency of removing dust effectively.

(3) The image capturing device, dust removal system and vibrating dust removal method can increase the amplitude or frequency of the vibration gradually during the dust removal process to shorten the required time of the dust removal process.

DETAILED DESCRIPTION OF THE PREFERRED EMBODIMENTS

The technical contents and characteristics of the image capturing device and its image processing method in accordance with the present invention will be apparent with the detailed description of a preferred embodiment accompanied with related drawings as follows. For simplicity, same numerals are used in the following preferred embodiment to represent respective same elements.

The image capturing device of the present invention can be a lens-replaceable type camera or a digital single lens reflex camera. To facilitate the description of the technical characteristics of the present invention, the lens-replaceable type camera is used as an example for the illustration, but the invention is not limited to such camera only.

Figure 1:
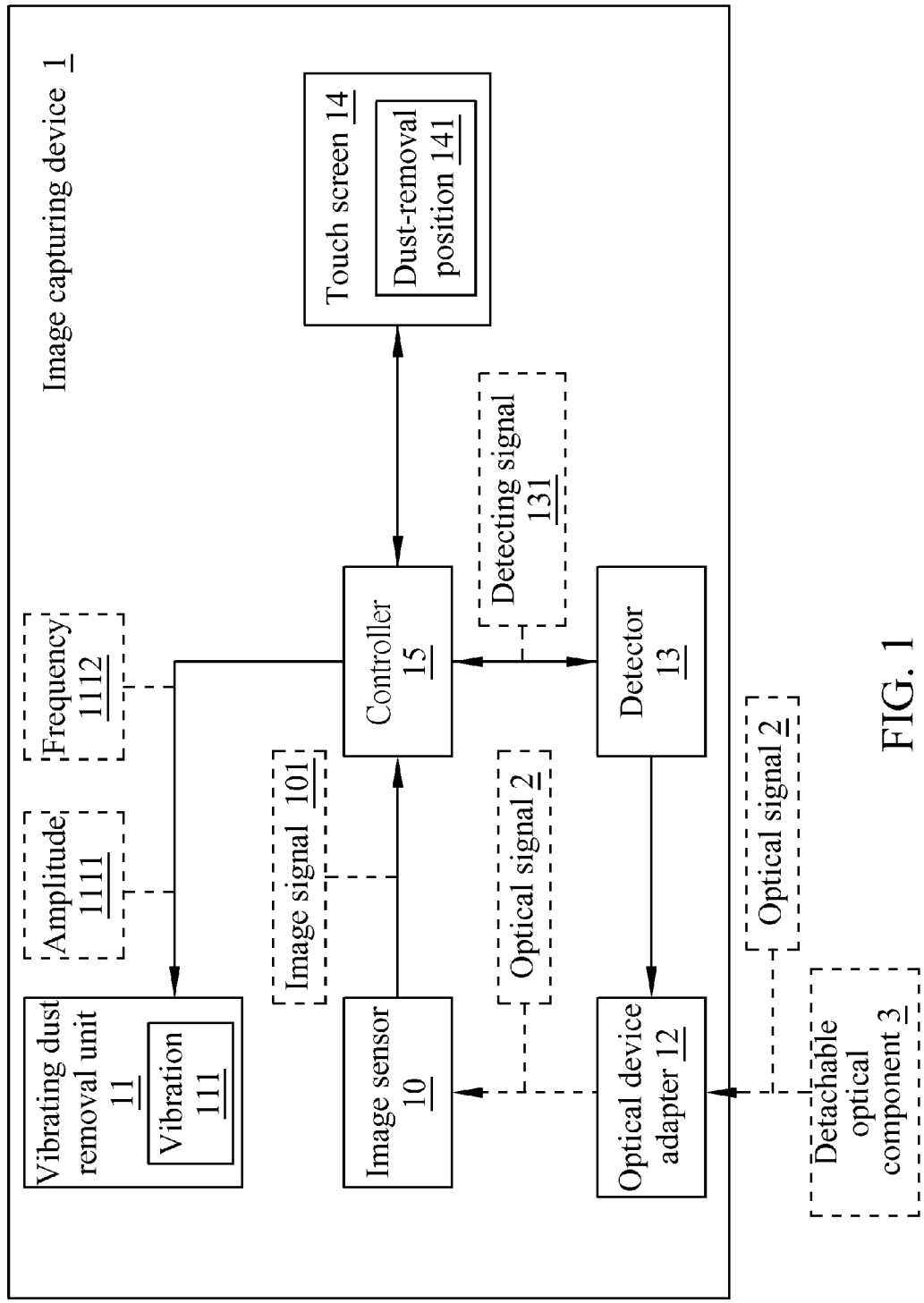
FIG. 1 is a block diagram of an image capturing device in accordance with a preferred embodiment of the present invention.

With reference to FIG. 1 for a block diagram of an image capturing device in accordance with a preferred embodiment of the present invention, the image capturing device 1 comprises an image sensor 10, a vibrating dust removal unit 11, an optical component adapter 12, a detector 13, a touch screen 14 and a controller 15. The image sensor 10 is provided for receiving an optical signal 2 and converting the optical signal 2 into an image signal 101, and the image sensor 10 can be a complementary metal oxide semiconductor (CMOS) or a charge coupled device (CCD), an analog/digital circuit, an image processor. The vibrating dust removal unit 11 produces a vibration 111 to perform the dust removal of the image sensor 10. The detector 13 is provided for detecting whether a detachable optical component 3 is connected to an optical component adapter 12 and generating a detecting signal 131, wherein the detachable optical component 3 can be a lens exchangeable type camera (such as a digital single lens reflex (DSLR) camera. The touch screen 14 is provided for displaying the image signal 101 and provided for a user to touch a dust-removal position 141.

The controller 15 is electrically coupled to the image sensor 10, the vibrating dust removal unit 11, the detector 13 and the touch screen 14, wherein the controller 15 is a central processing unit (CPU) or a micro processing unit). The controller 15 is provided for receiving the detecting signal 131 to enter into a dust-removal mode, or determining an amplitude 1111 or a frequency 1112 of a vibration 111 produced by the vibrating dust removal unit 11 according to the dust-removal position 141. When the controller 15 determines an amplitude 1111 or a frequency 1112 of the vibration 111 produced by the vibrating dust removal unit 11 according to the dust-removal position 141, the controller 15 controls the vibrating dust removal unit 11 to perform a dust removal of the image sensor 10 according to the determined amplitude 1111, frequency 1112 or both. Wherein, the amplitude 1111 or frequency 1112 of the vibration 111 can be determined by the parameter list provided by the manufacturer of the vibrating dust removal unit 11 to set a plurality of manufacturer's default parameters of the image capturing device 1.

Figure 2:
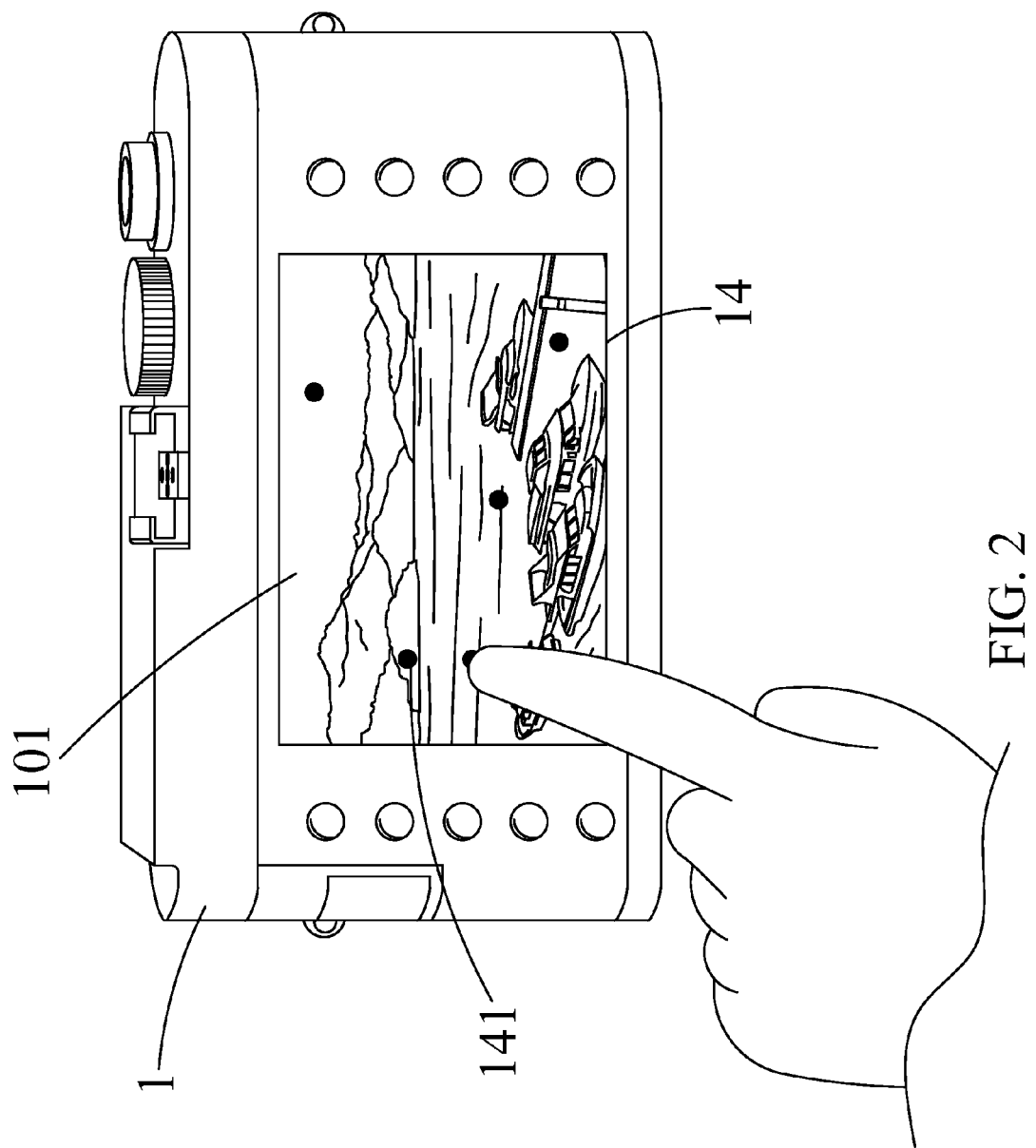
FIG. 2 is a schematic view of an image capturing device in accordance with a preferred embodiment of the present invention.

With reference to FIG. 2 for a schematic view of an image capturing device in accordance with a preferred embodiment of the present invention, the image capturing device 1 can be a lens-replaceable type image capturing device. In the preferred embodiment as shown in FIG. 1, the image sensor 10 receives an optical signal 2 and converts the optical signal 2 into an image signal 101. Since the dust adhered onto the image sensor 10 affects the original optical signal 2, therefore one or more of the adhered dust spots become a portion of the image signal 101. When the touch screen 14 displays the image signal 101, the dust spot will be displayed at the same time. When the user uses the image capturing device 1 to perform the vibrating dust removal, the user can check the dust-removal position 141 on the touch screen 14. Since the touch screen 14 can be pressed by the user's finger to generate the corresponding signal, therefore the user can intuitively touch at the dust-removal position 141 on the touch screen 14. The controller 15 is provided for receiving the dust-removal position 141 and determining an amplitude 1111 or a frequency 1112 of the vibration 111 according to the dust-removal position 141. When the controller 15 determines the amplitude 1111 or frequency 1112 of the vibration 111 to control the vibrating dust removal unit 11 to vibrate the image sensor 10, the dust can be separated from the image sensor 10 by the vibration.

Figure 3:
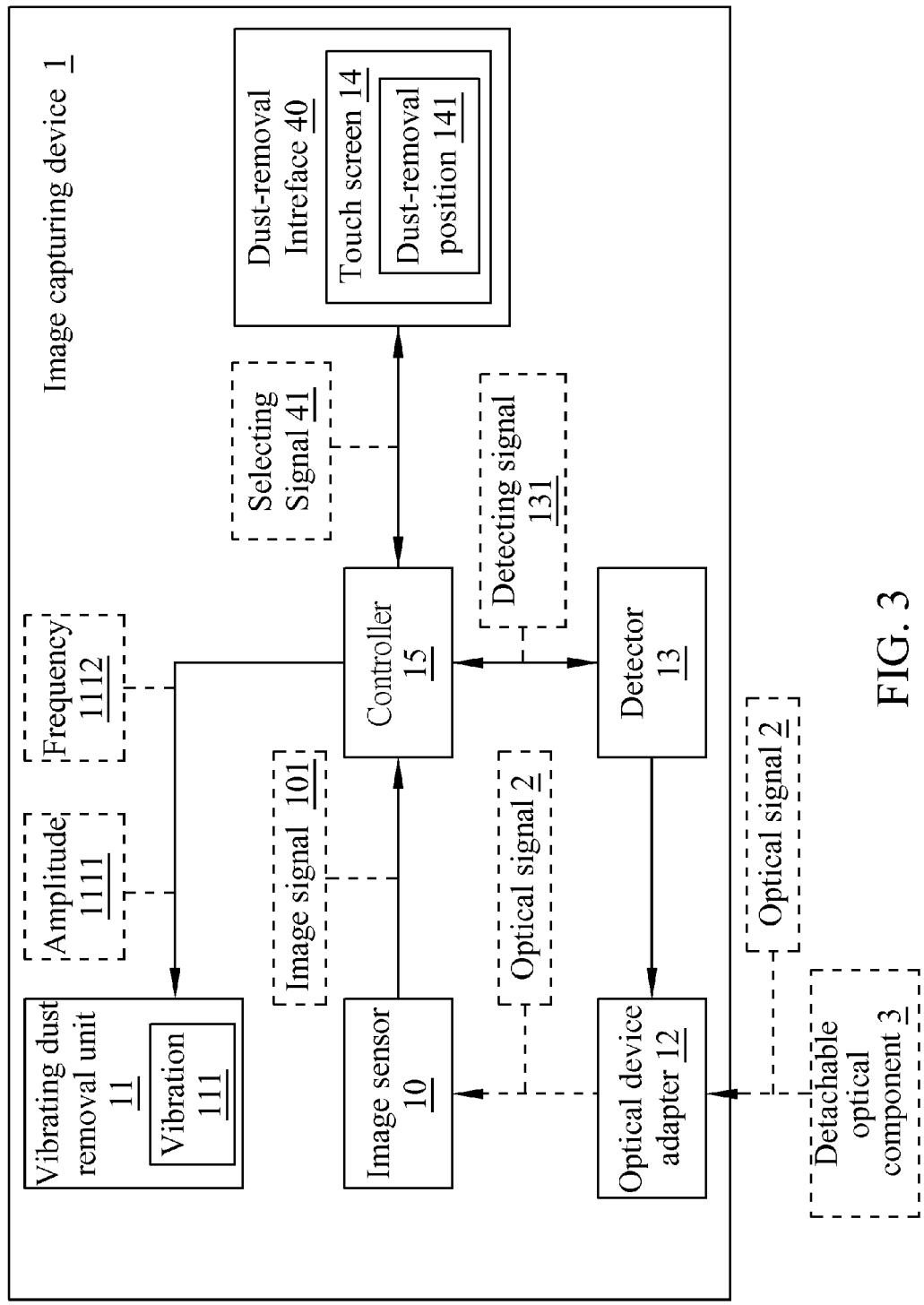
FIG. 3 is a block diagram of an image capturing device in accordance with another preferred embodiment of the present invention.
Figure 4:
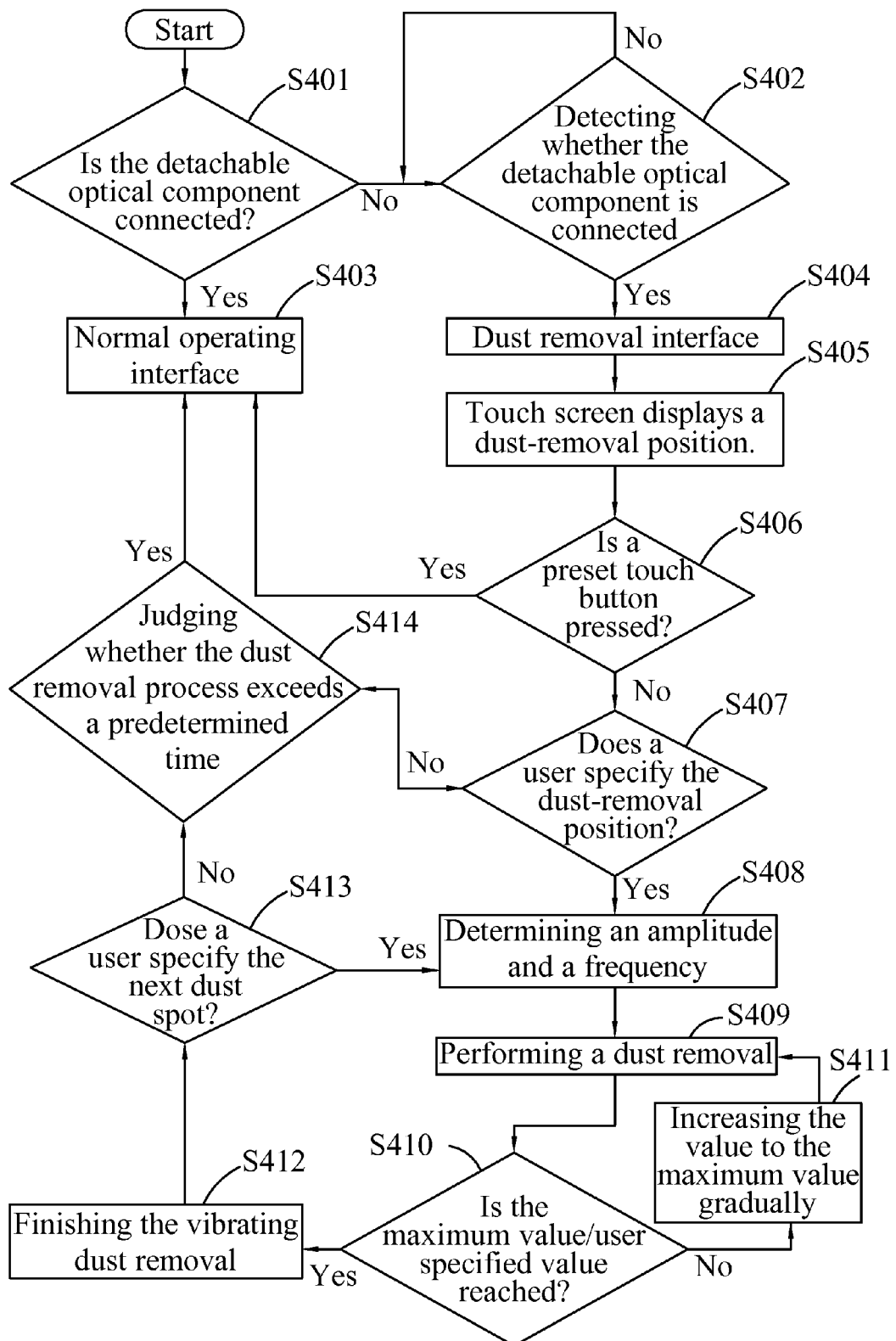
FIG. 4 is a flow chart of an image capturing device in accordance with the other preferred embodiment of the present invention.

With reference to FIGS. 3 and 4 for a block diagram and a flow chart of an image capturing device in accordance with another preferred embodiment of the present invention respectively, this preferred embodiment is similar to the foregoing preferred embodiment, and the similar part will not be described. In FIGS. 3 and 4, the image capturing device 1 comprises an image sensor 10, a vibrating dust removal unit 11, an optical component adapter 12, a detector 13, a dust-removal interface 40 and a controller 15. Wherein, the dust-removal interface 40 displays a dust-removal position 141 on a display unit for the user to browse. The user can touch a dust-removal position 141 from a selecting module according to the dust-removal interface 40 to generate a selecting signal 41. Wherein, the touch screen 14 can be used for combining the display unit and the selecting module, or designing the selecting module as the plurality of control buttons installed on the image capturing device 1, and this preferred embodiment uses the touch screen 14 as an example for illustrating the present invention.

When the user presses a power button (not shown in the figure) of the image capturing device 1, the image capturing device 1 enters into the power-on state, the detector 13 detects an installation status of the power-on state (as shown in S401 of FIG. 4), and determines whether the detachable optical component 3 (or the camera lens) is connected to the optical component adapter 12 (which is the installation status of the detachable optical component 3). When the detector 13 detects that the detachable optical component 3 is coupled to the optical component adapter 12 during the power-on process, a detecting signal 131 is generated, and the controller 15 controls the image capturing device 1 to enter into a normal operating interface including image capturing, browsing and editing (as shown in S403 of FIG. 4) according to the detecting signal 131. If the detector 13 detects that the detachable optical component 3 has not connected to the optical component adapter 12 in the power-on process, the detector 13 will continue the detection until the detachable optical component 3 is connected to the optical component adapter 12 (as shown in S402 of FIG. 4). If the detachable optical component 3 is connected to the optical component adapter 12, a detecting signal 131 will be generated. Now, the controller 15 controls the image capturing device 1 to enter into the dust-removal interface 40 (as shown in S404 of FIG. 4).

In the dust-removal interface 40, the touch screen 14 will display dust-removal position 141 of one or more dust spots on the image sensor 10 by a live view method (as shown in S405 of FIG. 4), and the user can check the dust-removal position 141 on the touch screen 14, and the user's finger touches at the specified dust-removal position 141 to generate the corresponding selecting signal 41 (as shown in S407 of FIG. 4). It is noteworthy to point out that if the touch screen 14 continues displaying the dust-removal position 141 for a predetermined time (such as 1 or 2 minutes), and the user does not take any selection action, and the controller 15 will control the image capturing device 1 to enter into a normal operating interface, or if the touch screen 14 continues displaying the dust-removal position 141 for a predetermined time, and a preset press button (not shown in the figure) is pressed, and the image capturing device 1 is entered into a normal operating interface (as shown S406 of FIG. 4). In this preferred embodiment, the preset button enters into the normal operating interface.

If the controller 15 receives the selecting signal 41 and determines the amplitude 1111 or the frequency 1112 of the vibration 111 produced by the vibrating dust removal unit 11 (as shown in S408 of FIG. 4) according to the selecting signal 41, and the controller 15 controls the vibrating dust removal unit 11 to perform a vibrating dust removal of the image sensor 10 (as shown in S409 of FIG. 4). Now, if the user continues touching the dust-removal position 141 to continuously produce the selecting signal 41, and the controller 15 controls the vibrating dust removal unit 11 to increase an amplitude 1111 or a frequency 1112 of the vibration 111 (as shown in S411 of FIG. 4). Wherein, if the amplitude 1111 or frequency 1112 of the vibration 111 reaches the maximum value (as shown in S410 of FIG. 4), the controller 15 controls the vibrating dust removal unit 11 to stop producing the vibration 111 (as shown in S412 of FIG. 4). In other words, if an appropriate amplitude 1111 or frequency 1112 of the vibration 111 is used for the vibrating dust removal and their values are increased to the maximum gradually, it means that the dust on the image sensor 10 is not separated and adhesive force of the dust is stronger, so that it is necessary to remove the dust manually. In view of this problem, the present invention can remove the dust by vibration without expending extra electric power of the image capturing device 1. If the user stops touching the dust-removal position 141 (as shown in S410 of FIG. 4), it means that the dust on the image sensor 10 has been removed, or the user wants to take related shooting action and thus the controller 15 will control the vibrating dust removal unit 11 to stop producing the vibration 111 (as shown in S412 of FIG. 4).

If the vibrating dust removal unit 11 stops producing the vibration 111, the touch screen 14 will display the dust-removal position 141 for a user to touch the next dust spot (as shown in S413 of FIG. 4) to perform the vibrating dust removal of the image sensor 10. Wherein, the user can press the preset press button to drive the image capturing device 1 to exit the dust-removal interface 40 to enter into the normal operating interface. If the dust removal process exceeds a predetermined time (as shown in S414 of FIG. 4), the process will enter into a normal operating interface, and prevent the user from wasting additional electric power for the dust removal, under the condition without a power supply to the image capturing device 1. As a result, the normal camera operation can be executed. Wherein, it is noteworthy to point out that if the time for the touch screen 14 to display the dust-removal position 141 has been performed over a predetermined time, and the user has not performed any operation, then the image capturing device 1 enters into a normal operating interface.

Figure 5:
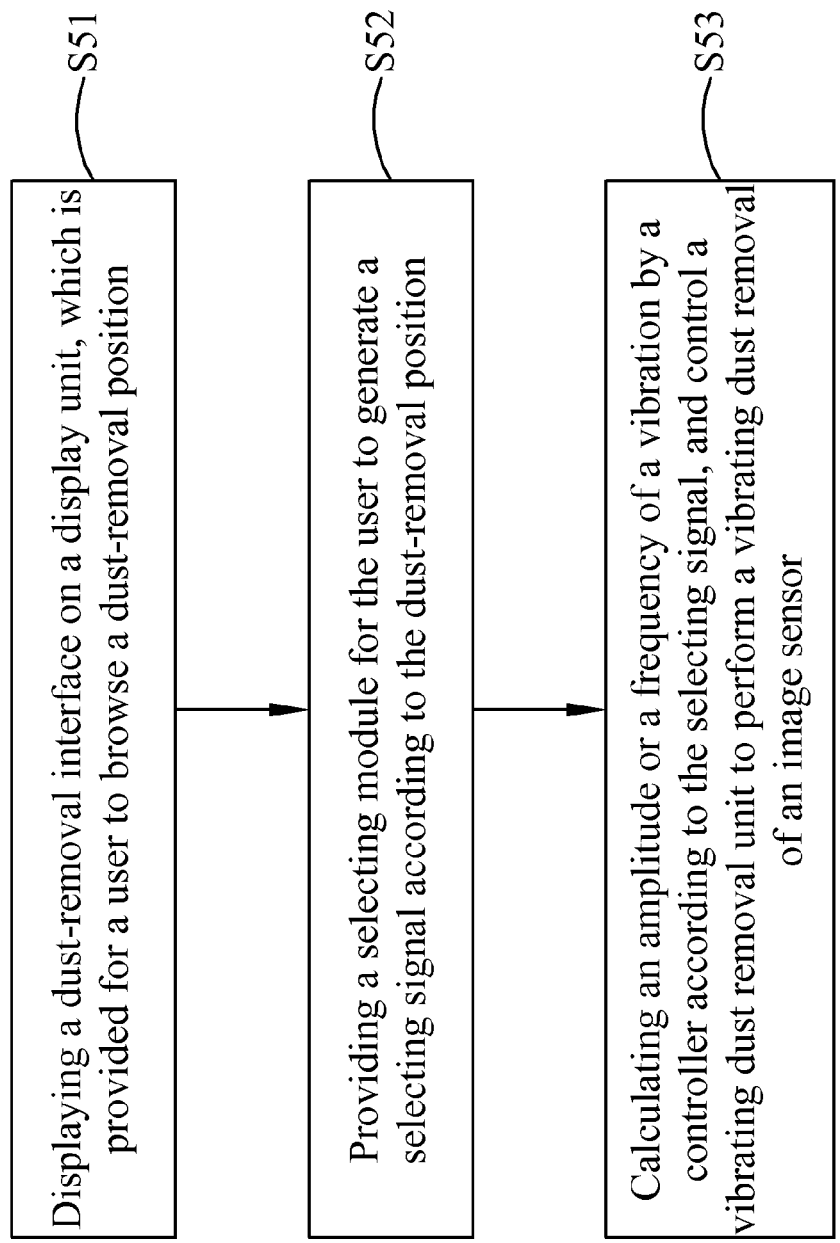
FIG. 5 is a flow chart of a vibrating dust removal method in accordance with the present invention.

With reference to FIG. 5 for a flow chart of a vibrating dust removal method in accordance with the present invention, the vibrating dust removal method is applicable in an image capturing device which can be a lens exchangeable type image capturing device, and the image capturing device comprises an image sensor, a vibrating dust removal unit, an optical component adapter, a detector, a dust-removal interface and a controller. The vibrating dust removal method comprises the following steps:

S51: Displaying a dust-removal interface on a display unit, which is provided for a user to browse a dust-removal position;

S52: Providing a selecting module for the user to generate a selecting signal according to the dust-removal position; and S53: Calculating an amplitude or a frequency of a vibration by a controller according to the selecting signal, and controlling a vibrating dust removal unit to perform a vibrating dust removal of an image sensor.

The vibrating dust removal method of the image capturing device of the present invention has been described in the section of the image capturing device of the present invention, and thus will not be described here.

In summation of the description above, the image capturing device, the dust removal system and the vibrating dust removal method in accordance with the present invention can display the dust-removal position on the touch screen so that the user can confirm the dust spot conveniently, and touch the desired dust-removal position intuitively. This method allows the user to save the time of confirming the dust spot repeatedly. Then, the controller can determine the amplitude or frequency of the vibration according to the dust-removal position, and increase the amplitude or frequency of the vibration in dust removal process for the vibrating dust removal. Wherein, the controller determines whether to perform the vibrating dust removal of the dust spot by using appropriate amplitude or frequency of the vibration and gradually increases the amplitude or frequency of the vibration, so as to achieve the dust removal efficiently without wasting much electric power.

What is claimed is:

1. An image capturing device, comprising:
 an image sensor, receiving an optical signal, and converting the optical signal into an image signal;
 a vibrating dust removal unit, producing a vibration to perform a dust removal of the image sensor;
 an optical component adapter;
 a detector, for detecting whether a detachable optical component is connected to the optical component adapter, and generating a detecting signal;
 a touch screen, displaying the image signal, and allowing a user to touch a dust-removal position; and
 a controller, entering into a dust-removal mode upon the receipt of the detecting signal, or controlling a frequency or an amplitude of the vibration generated by the vibrating dust removal unit according to the dust-removal position;
 wherein when the user continues touching the dust-removal position, the controller controls the vibrating dust removal unit to increase the amplitude or the frequency of the vibration gradually.

2. The image capturing device of claim 1, wherein when the controller controls the vibrating dust removal unit to perform the dust removal for a time exceeding a predetermined time, the controller controls the vibrating dust removal unit to stop producing the vibration.

3. The image capturing device of claim 1, wherein when the user stop touching the dust-removal position, or the amplitude or the frequency of the vibration reaches the maximum value, the controller controls the vibrating dust removal unit to stop producing the vibration.

4. A dust removal system, applicable in an image capturing device installed with a detachable lens, comprising:
 a vibrating dust removal unit, producing a vibration to perform a dust removal of an image sensor of the image capturing device;
 a dust-removal interface, displayed on a display unit, and provided for a user to browse a dust-removal position;
 a selecting module, provided for the user to generate a selecting signal according to the dust-removal position of the dust-removal interface; and
 a controller, calculating an amplitude or a frequency of the vibration according to the selecting signal, so as to control a vibrating dust removal unit to perform a vibrating dust removal.

5. The dust removal system of claim 4, further comprising a detector for detecting an installation status of the detachable lens when the lens-replaceable type image capturing device is turned on.

6. The dust removal system of claim 5, wherein the controller determines whether the image capturing device operates at a normal operating interface or the dust-removal interface according to the installation status.

7. The dust removal system of claim 4, wherein the dust-removal position indicates at least one dust spot displayed on the image sensor of the image capturing device.

8. The dust removal system of claim 4, wherein when the user continues selecting the dust-removal position, the controller controls the vibrating dust removal unit to increase the amplitude and the frequency of the vibration gradually.

9. The dust removal system of claim 4, wherein when the user finishes selecting the dust-removal position or the amplitude and the frequency of the vibration reaches the maximum value, the controller controls the vibrating dust removal unit to stop producing the vibration.

10. The dust removal system of claim 4, wherein when the vibrating dust removal unit produces vibration over a predetermined time, the controller controls the vibrating dust removal unit to stop producing the vibration.

11. The dust removal system of claim 4, wherein the selecting module is a touch module installed at the display unit or a plurality of control buttons installed at the image capturing device.

12. A vibrating dust removal method, applicable in an image capturing device installed with a detachable lens, and the vibrating dust removal method comprising the steps of:
 displaying a dust-removal interface on a display unit for a user to browse a dust-removal position;
 providing a selecting module for the user to generate a selecting signal according to the dust-removal position; and
 using a controller to calculate an amplitude or a frequency of the vibration according to the selecting signal and control a vibrating dust removal unit to perform a vibrating dust removal of an image sensor.

13. The method of claim 12, further comprising the steps of:
using a detector to detect an installation status of the detachable lens, when the image capturing device is turned on; and
using the controller to determine whether the image capturing device performs a normal operating interface or the dust-removal interface according to the installation status.

14. The method of claim 12, wherein the dust-removal position indicates at least one dust spot displayed on the image sensor of the image capturing device.

15. The method of claim 12, further comprising the step of increasing the amplitude or the frequency of the vibration gradually when the user continues selecting the dust-removal position.

16. The method of claim 12, further comprising the steps of:
controlling the vibrating dust removal unit by the controller to stop producing the vibration when the user finishes selecting the dust-removal position or the amplitude or the frequency of the vibration reaches the maximum value; and
allowing the user to enter into a next dust-removal interface or a normal operating interface.

17. The method of claim 12, further comprising the steps of:
calculating whether the vibration of the vibrating dust removal unit for the dust removal exceeds a predetermined time; and
controlling the vibrating dust removal unit to stop producing the vibration, if the vibration is performed exceeding the predetermined time.

18. The method of claim 12, wherein the selecting module is a touch module installed at the display unit or a plurality of control buttons installed at the image capturing device.

\* \* \* \* \*